(12) United States Patent
Takagishi et al.

(10) Patent No.: US 6,874,156 B2
(45) Date of Patent: Mar. 29, 2005

(54) OPTICAL INFORMATION RECORDING MEDIUM

(75) Inventors: Yoshikazu Takagishi, Fujioka (JP); Atsuo Shimizu, Osato-gun (JP); Ryuichi Sunagawa, Takasaki (JP); Keiichi Ida, Gunma-gun (JP); Mitsuo Sekiguchi, Tano-gun (JP); Isao Matsuda, Takasaki (JP)

(73) Assignee: Taiyo Yuden Co., Ltd., Tokyo (JP)

( * ) Notice: Subject to any disclaimer, the term of this patent is extended or adjusted under 35 U.S.C. 154(b) by 0 days.

(21) Appl. No.: 10/110,755
(22) PCT Filed: Feb. 14, 2001
(86) PCT No.: PCT/JP01/01020
§ 371 (c)(1), (2), (4) Date: Apr. 17, 2002
(87) PCT Pub. No.: WO01/59779
PCT Pub. Date: Aug. 16, 2001

(65) Prior Publication Data
US 2002/0150034 A1 Oct. 17, 2002

(30) Foreign Application Priority Data
Feb. 14, 2000 (JP) .................................. 2000-035288

(51) Int. Cl.$^7$ ................................................ G11B 7/24
(52) U.S. Cl. ........................................ 720/718; 369/277
(58) Field of Search .............................. 369/277, 275.1, 369/275.3, 275.4; 720/718

(56) References Cited

U.S. PATENT DOCUMENTS 5,080,946 A    1/1992 Takagisi et al.
5,517,486 A  * 5/1996 Haneda ..................... 369/280
5,763,037 A  * 6/1998 Ohtomo et al. ............ 428/64.1
6,051,299 A  * 4/2000 Uchiyama et al. ........ 428/65.3
6,254,966 B1 * 7/2001 Kondo ...................... 428/156
6,288,998 B1 * 9/2001 Taira ....................... 369/275.4
2001/0030937 A1 * 10/2001 Sakamoto et al. ......... 369/277
2002/0054563 A1 * 5/2002 Yamaoka et al. ........ 369/275.4

FOREIGN PATENT DOCUMENTS

JP    03-230332    10/1991
JP    09-293274    11/1997
JP    10-181203    7/1998

OTHER PUBLICATIONS

Japanese Patent Office Action, titled "Refusing Reason Notice" (1 page), mailed on Dec. 9, 2003 for a counterpart foreign application, and its English translation.

* cited by examiner

Primary Examiner—A. J. Heinz
Assistant Examiner—Mark Blouin
(74) Attorney, Agent, or Firm—Finnegan, Henderson, Farabow, Garrett & Dunner, L.L.P.

(57) ABSTRACT

An optical information recording medium recordable at a high density two times or more higher than that of currently-used CD-Rs by optimally determining the thicknesses of a recording layer and a reflecting layer. The optical information recording medium comprises the recording layer formed on a transparent substrate having a spiral pregroove formed thereon, wherein a track pitch Tp of the pregroove is $1.0\ \mu m \leq Tp \leq 1.2\ \mu m$ and a thickness Dg of the recording layer on the pregroove is $80\ nm \leq Dg \leq 120\ nm$.

3 Claims, 4 Drawing Sheets

ENLARGED DIAGRAM OF ESSENTIAL PART OF OPTICAL INFORMATION RECORDING MEDIUM

GENERAL STRUCTURAL DIAGRAM OF OPTICAL
IMFORMATION RECORDING MEDIUM

ENLARGED DIAGRAM OF ESSENTIAL PART
OF OPTICAL INFORMATION RECORDING MEDIUM

OPTICAL INFORMATION RECORDING MEDIUM

TECHNICAL FIELD

The present invention relates to an optical information recording medium of once type such as a CD-R (Compact Disc-Recordable), and more particularly to an optical information recording medium recordable at a high density two times or more higher than that of currently-used CD-Rs.

BACKGROUND ART

Generally, a CD-R is known as an optical information recording medium of write-once type which is reproduced by a CD (Compact Disc) drive or a CD-ROM (Compact Disc Read Only Memory) drive.

The optical recording medium such as a CD-R has a basic structure in which a recording layer having an organic dye film is formed on a transparent substrate having a spiral pregroove, a reflecting layer of a metallic film is formed thereon, and further a protective layer of an ultraviolet curing resin is formed thereon, and is configured to record by irradiating a laser beam from the side of the transparent substrate to the recording layer to partly decompose the dye of the recording layer.

This optical information recording medium is expanding its market rapidly because of merits such as compatibility with CDs and a unit cost per bit lower than that of paper, and recording apparatuses, which can write at a recording speed ten times or more higher than an ordinary speed, and corresponding media are being supplied to the market in response to needs for high-speed processing.

Furthermore, it is demanded on the market that a high capacity is provided in correspondence with an increasing amount of data processing every year, and it is assumed that a capacity of 1.3 GB (Giga Bytes) or more is required for an amount of data for image processing or the like.

When the above pits are recorded by means of a laser beam having a wavelength of 780 nm, NA (Numerical Aperture) of 0.45 to 0.50 and a spot diameter of about 1.6 $\mu$m employed in the current CD-ROM/-R/-RW drives in order to secure a recording amount of about two times of the currently used ones without changing an outer diameter of conventional optical information recording media of write once type, there are problems as described below.

Specifically, when a tracking pitch is simply changed to have a smaller interval, unwanted signals are taken from an adjacent track when reproducing, namely so-called crosstalk increases, and a clear signal cannot be obtained, resulting in increase of so-called jitter which is the variation in the pit signal at the time of reproduction.

When the recording pits are merely configured to be formed in high density in a linear velocity direction, an effect of heat generated when the pits are formed causes a phenomenon which is called heat interference affecting on the recording state of the next pit, a length of the previously recorded pit and an interval to the next pit become short, so that a position of the next written pit is easily displaced. As a result, a jitter becomes worse. This phenomenon is also seen when recording at a high speed.

DISCLOSURE OF THE INVENTION

It is an object of the present invention to provide an optical information recording medium recordable at a high density two times or more higher than that of currently-used CD-Rs by optimally determining the thicknesses of a recording layer and a reflecting layer.

The optical information recording medium according to the present invention has a recording layer formed on a transparent substrate having a spiral pregroove formed thereon, wherein a track pitch Tp of the pregroove is 1.0 $\mu$m$\leq$Tp$\leq$1.2 $\mu$m; and a thickness Dg of the recording layer on the pregroove is 80 nm$\leq$Dg$\leq$120 nm.

When the thickness Dg of the recording layer on the pregroove exceeds 120 nm, heat accumulation when forming pits becomes a problem, resulting in worsening RF jitter (hereinafter called as jitter). And, when Dg is not more than 80 nm, modulation is small and an S/N ratio lowers, so that jitter increases.

It is preferable that a thickness Dl of the recording layer on a land of the substrate is in a rage of 15$\leq$Dl$\leq$55 nm. When Dl exceeds 55 nm, expansion of pits onto the land becomes large, and crosstalk becomes large, becoming a cause of jitter. And, when it is less than 15 nm, sufficient modulation cannot be obtained when reproducing, and an S/N ratio has a problem, resulting in increasing jitter.

The thickness Dg of the recording layer on the pregroove corresponds to a distance from the bottom of the pregroove to the top end of the recording layer, and the thickness Dl of the recording layer on the land corresponds to a distance from the top end of the land to the top end of the recording layer.

Describing in principle, optical recording sensitivity in the pregroove is improved by adjusting the thickness Dg of the recording layer on the pregroove to be closer to $\lambda$/4 optically, and a pit is hardly written on the land by adjusting the thickness Dl of the recording layer on the land to be closer to 0 optically. Thus, a width of the pit to be recorded is limited within the groove, so that crosstalk to the pit on the adjacent track lowers, and good signal reproduction can be made.

Average thickness Dav of the recording layer is preferably in a range of 40 nm$\leq$Dav$\leq$80 nm. When the average dye thickness Dav of the recording layer exceeds 80 nm, heat accumulation when forming the pit becomes a problem, resulting in worsening jitter. And, when Dav is not more than 80 nm, modulation is small and an S/N ratio lowers, so that jitter increases.

The thickness Drf of the reflecting layer is preferably Drf$\geq$50 nm. When the thickness Drf of the reflecting layer is less than 50 nm, sufficient reflection of a laser beam cannot be obtained, and sufficient dissipation of heat cannot be made, so that jitter is increased due to heat interference.

BEST MODE FOR CARRYING OUT THE INVENTION

A mode of implementation of the optical information recording medium according to the present invention will be described in detail with reference to the accompanying drawings.

Figure 1:
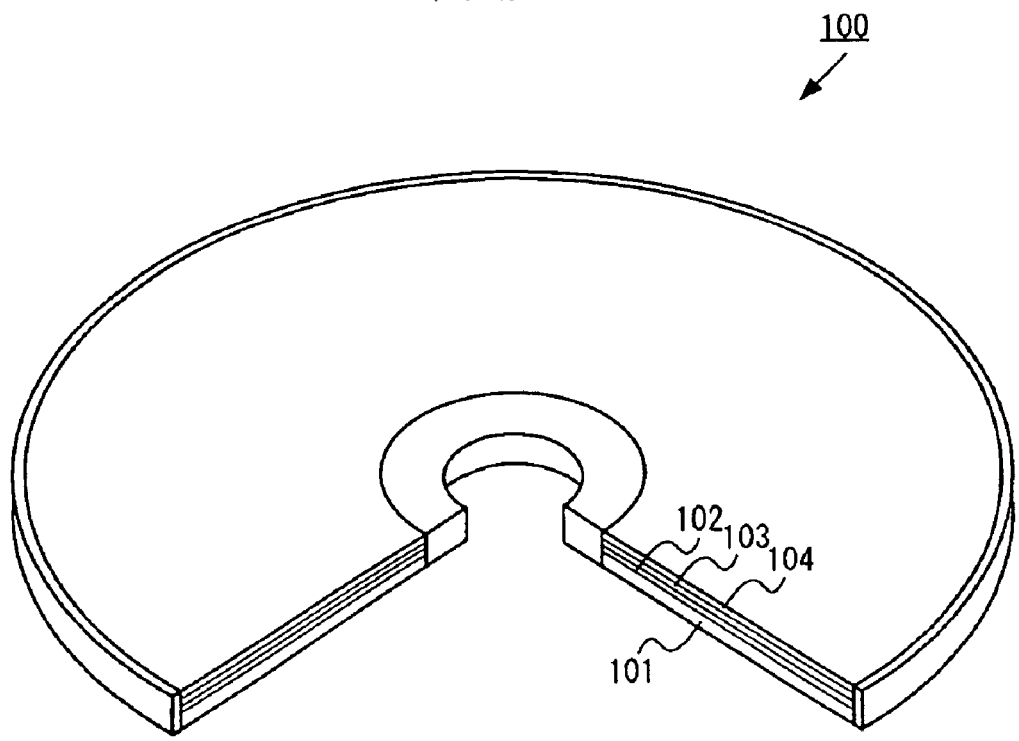
FIG. 1 is a perspective diagram partly broken away of a general structure of an optical information recording medium according to the present invention.
Figure 2:
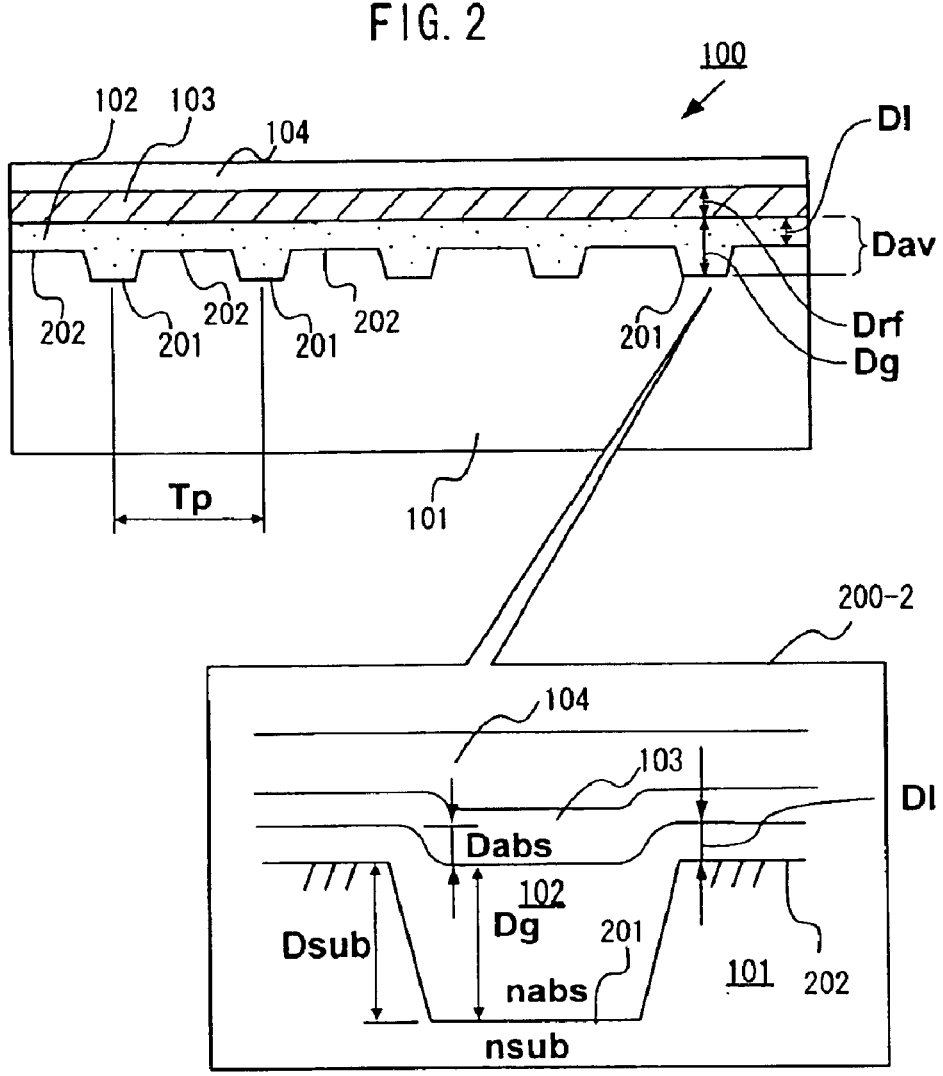
FIG. 2 is an enlarged sectional diagram showing an essential part of the optical information recording medium shown in FIG. 1.

FIG. 1 is a perspective diagram partly broken away of a general structure of the optical information recording medium according to the present invention, and FIG. 2 is an enlarged sectional diagram showing an essential part of the optical information recording medium shown in FIG. 1.

In FIG. 2, the sectional diagram of the optical information recording medium of FIG. 1 taken in its radial direction is shown, wherein block 200-2 shows an enlarged view of a groove section.

In FIG. 1 and FIG. 2, an optical information recording medium 100 is formed by forming a recording layer 102, which is formed of an organic dye film, on a transparent substrate 101 by a film-forming method, e.g., a spin-coating method or the like, and forming a reflecting layer 103 on the recording layer 102 by a sputtering method, a vapor deposition method or a plasma CVD (Chemical Vapor Deposition) method, and forming a protective layer 104 on the reflecting layer 103.

Here, a spiral pregroove 201 is formed on the transparent substrate 101 and the spiral pregroove 201 can be formed by an injection forming method, which injection-forms the spiral pregroove 201 by means of a stamper. The spiral pregroove 201 may be formed by another forming method other than the stamper.

A material for the transparent substrate 101 can be various kinds of material which have high permeability to light having a wavelength of the laser beam used for recording and reproducing of information on and from the optical information recording medium 100 and is not deformed considerably by an external force, an environmental change, or the like, and polycarbonate can be used for example.

The organic dye film forming the recording layer 102 can be a dye material alone or one containing a prescribed amount of a stabilizing material in order to improve environmental stability.

The dye material includes those which have a high refractive index and an appropriate light absorptive coefficient in the vicinity of wavelength 770 nm to 830 nm of the laser beam used to record and reproduce information on and from the optical information recording medium 100. For example, cyanine dye, metal-containing phthalocyanine dye, metal-containing azo dye or the like can be used. As the optical information recording medium 100 of this mode of implementation, it is desirable to use benzoindodicarbo cyanine dye as the aforementioned dye material.

The reflecting layer 103 is a metallic film which mainly contains Au, Ag, Cu, Pd, Al, or an alloy of them and also a prescribed amount of other elements.

In the optical information recording medium 100 of this mode of implementation, in order to realize a recording capacity of 1.3 GB or more without changing the outer diameter of currently-used CD-Rs, a track pitch Tp is set to a range of $1.0\ \mu m \leq Tp \leq 1.2\ \mu m$, and the pregroove 201 is formed on the transparent substrate 101 of the optical information recording medium 100 in such a way to meet the track pitch Tp.

Here, the track pitch Tp is determined by an interval between the adjacent pregrooves 201, namely a distance between the centers of the adjacent pregrooves 201 as shown in FIG. 2.

When the track pitch Tp is less than $1.0\ \mu m$, jitter becomes 35 ns or more due to an effect of crosstalk, and the stable recording-reproducing properties cannot be obtained. Jitter of less than 35 ns is a value specified by the CD-R Standard, Orange Book Ver. 2.0.

When the track pitch Tp exceeds $1.2\ \mu m$, a linear velocity of 0.77 m/s or more is required on the side of a recording device in order to achieve a capacity of about 1.3 GB, and the stable recording-reproducing properties cannot be obtained due to heat interference.

Here, for the optical information recording medium 100 having the aforementioned track pitch, a shape of the recording layer 102 formed on the transparent substrate 101 is significant.

Figure 3:
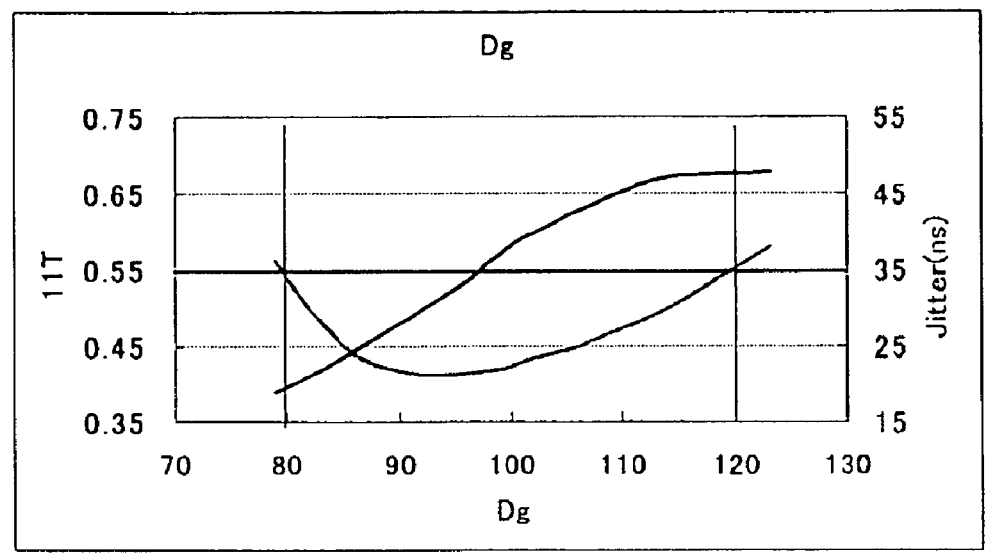
FIG. 3 is a diagram showing a prescribed standard of Dg.

For the shape of the recording layer 102, the thickness Dg of the recording layer 102 on the pregroove 201 is desirably $80\ nm \leq Dg \leq 120\ nm$. As shown in FIG. 3, a selection standard for Dg is determined as a value with which jitter becomes less than 35 ns.

Figure 4:
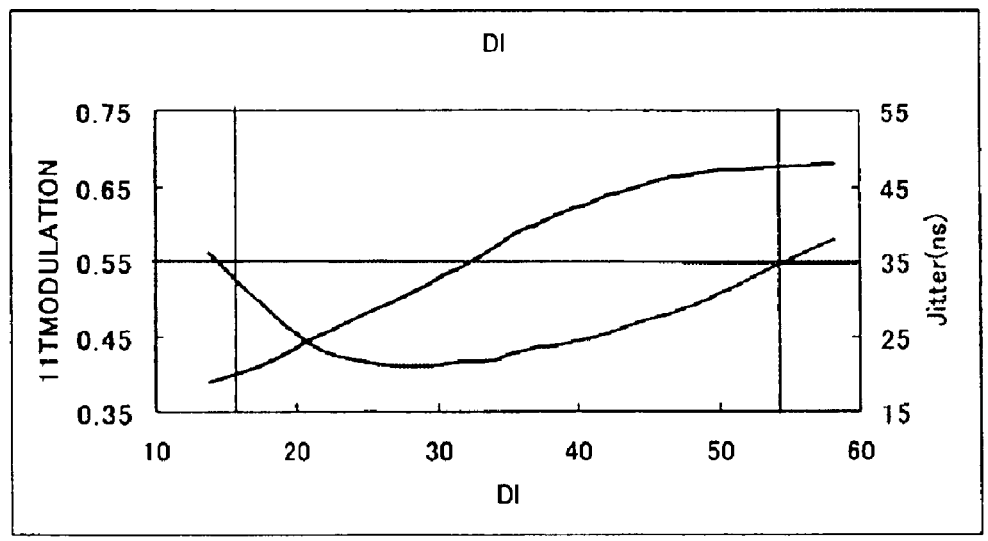
FIG. 4 is a diagram showing a prescribed standard of Dl.

Thickness Dl of the dye layer 102 on a land 202 is desirably $15\ nm \leq Dl \leq 55\ nm$. As shown in FIG. 4, a selection standard for Dl is determined as a value with which jitter becomes less than 35 ns.

Figure 5:
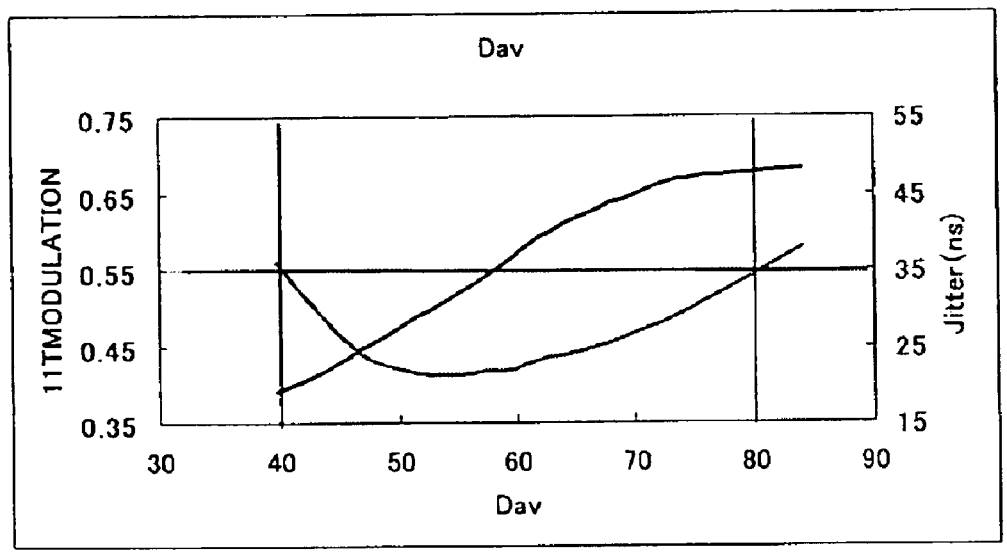
FIG. 5 is a diagram showing a prescribed standard of Dav.

Average thickness Dav of the recording layer is desirably $40\ nm \leq Dav \leq 80\ nm$. As shown in FIG. 5, a selection standard for Dav is determined as a value that jitter becomes less than 35 ns.

Figure 6:
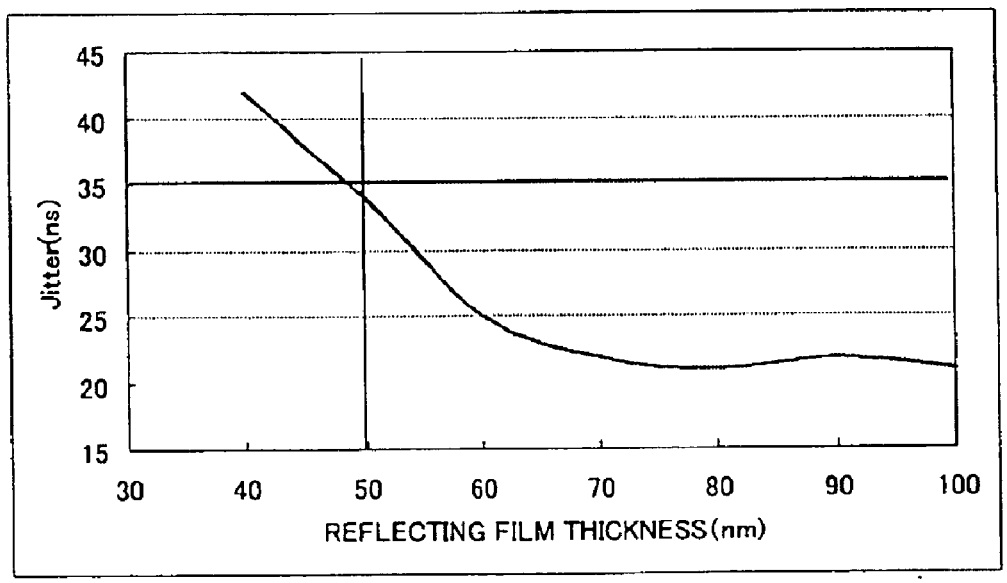
FIG. 6 is a diagram showing a prescribed standard of Drf.

Thickness Drf of the reflecting layer is desirably $Drf \leq 50$ nm. As shown in FIG. 6, a selection standard for Drf is determined as a value with which jitter becomes less than 35 ns.

The reflecting layer 103 formed on the recording layer 102 which is formed of an organic dye layer is a metallic film which mainly contains Au, Ag, Cu, Pd, Al, or an alloy of them and also a prescribed amount of other elements, but such a metallic film has thermal conductivity about two digits higher than that of the recording layer 102 which is made of an organic dye film, so that heat generated in the recording layer 102 is easily dissipated, and heat interference when recording can be controlled by designing a thickness of the reflecting layer 103.

Desirably, it is determined that a ratio Drf/Dg between the thickness Drf of the reflecting layer 103 and the thickness Dg of the recording layer 102 on the pregroove 201 is in a range of $0.40 \leq Def/Dg \leq 2.5$. When this ratio Drf/Dg is less than this range, jitter tends to become worse due to heat interface when reproducing, and when it is out of the range, a dye decomposition rate is hard to increase due to the dissipation of heat, and a sufficient degree of modulation is hardly obtained.

For optimization of heat interference when recording and optimization of optical conditions, an interference layer formed of an organic substance or an inorganic substance which is transparent at a laser wavelength may be disposed between the transparent substrate 101 and the recording layer 102 or between the recording layer 102 and the reflecting layer 103.

In-groove film thickness Dg, on-land film thickness Dl, average thickness Dav of the recording layer 102 can be measured by the following methods.

A. Top coat and reflecting layer are removed from the optical information recording medium (disc).

1) With the labeled surface of a disc upward, a highly adhesive tape is applied to the labeled surface.

2) A cut is made in this side of the peeling surface to make it easy to peel the top coat layer easily.

3) When the tape is peeled in one stroke, it can be separated from the reflecting surface without remaining the dye substantially because the dye (recording layer) and the polycarbonate substrate (transparent substrate) have a high adhesive force but the reflecting film and the dye interface have a poor adhesive force.

B. Measurement of thickness

1) Cuts into an appropriate size.

2) A masking tape is applied to a portion where a difference between the dye and the substrate can be seen, the dye is quickly washed with a solvent such as ethanol which does not dissolve the substrate, and the solvent is removed by an air gun.

3) The masking tape is removed, the cross section is observed for a relatively wide range by AFM (an area of 50 μm or more), and the dye thickness Dl on the land is measured.

4) Separately, the substrate shape and the dye shape are observed for an area of 5 to 10 μm by AFM, and a depth Dsub and a width Gw of the pregroove 201 and a thickness Dg of the recording layer on the pregroove are measured.

C. Calculation of average thickness Dav

Average thickness Dav (nm) is determined by the calculation expression:

$$Dav = Dl \times (Tp - Gw)/Tp + (Dl + Dsub - Dabs) \times Dsub/Tp.$$

INDUSTRIAL APPLICABILITY

The present invention can realize an optical information recording medium having a recording capacity two times or more higher than that of currently-used CD-Rs by using a material having optimum heat characteristics as an organic dye material of a recording layer without changing an outer diameter of the currently-used CR-Rs and can provide an optical information recording medium recordable at a high density two times or more higher than that of currently-used CD-Rs, which can comply with the high capacity for recording in order to deal with the amount of data processing increasing every year.

What is claimed is:

1. An optical information recording medium having a recording layer and a reflecting layer formed on a transparent substrate having a spiral pregroove formed thereon, wherein:

a track pitch Tp of the pregroove is $1.0\,\mu m \leq Tp \leq 1.2\,\mu m$;

a thickness Dg of the recording layer on the pregroove is $80\,nm \leq Dg \leq 120\,nm$; and a thickness Drf of the reflecting layer is so determined that a ratio Drf/Dg of the thickness Drf of the reflecting layer to the thickness Dg of the recording layer on the pregroove becomes $0.40 \leq Drf/Dg \leq 2.5$.

2. An optical information recording medium having a recording layer and a reflecting layer formed on a transparent substrate having a spiral pregroove formed thereon, wherein:

a track pitch Tp of the pregroove is $1.0\,\mu m \leq Tp \leq 1.2\,\mu m$;

an average thickness Dav of the recording layer is $40\,nm \leq Dav \leq 80\,nm$; and a thickness Drf of the reflecting layer is so determined that a ratio Drf/Dg of the thickness Drf of the reflecting layer to a thickness Dg of the recording layer on the pregroove becomes $0.40 \leq Drf/Dg \leq 2.5$.

3. An optical information recording medium having a recording layer and a reflecting layer formed on a transparent substrate having a spiral pregroove formed thereon, wherein:

a track pitch Tp of the pregroove is $1.0\,\mu m \leq Tp \leq 1.2\,\mu m$;

a thickness Dg of the recording layer on the pregroove is $80\,nm \leq Dg \leq 120\,nm$;

a thickness Dl of the recording layer on the land of the substrate is $15\,nm \leq Dl \leq 55\,nm$;

an average thickness Dav of the recording layer is $40\,nm \leq Dav \leq 80\,nm$;

a thickness Drf of the reflecting layer is $Drf \geq 50\,nm$; and the thickness Drf of the reflecting layer is so determined that a ratio Drf/Dg of the thickness Drf of the reflecting layer to the thickness Dg of the recording layer the pregoove becomes $0.40 \leq Drf/Dg \leq 2.5$.

* * * * *